(12) United States Patent  
MacGuire

(10) Patent No.: US 8,027,919 B2
(45) Date of Patent: Sep. 27, 2011

(54) METHOD AND APPARATUS FOR ALLOWING SECURED OVERDRAFTS OF RELOADABLE DEBIT CARD ACCOUNTS

(76) Inventor: Sean MacGuire, Key West, FL (US)

( * ) Notice: Subject to any disclaimer, the term of this patent is extended or adjusted under 35 U.S.C. 154(b) by 0 days.

(21) Appl. No.: 11/701,174

(22) Filed: Feb. 1, 2007

(65) Prior Publication Data

US 2007/0219900 A1  Sep. 20, 2007

Related U.S. Application Data

(60) Provisional application No. 60/763,956, filed on Feb. 1, 2006.

(51) Int. Cl.
G06Q 40/00 (2006.01)
(52) U.S. Cl. ............................................. 705/41; 705/35
(58) Field of Classification Search .................... 705/39, 705/41, 35
See application file for complete search history.

(56) References Cited

U.S. PATENT DOCUMENTS

| | | | |
|---|---|---|---|
| 5,689,100 A * | 11/1997 | Carrithers et al. ............ 235/380 |
| 6,304,860 B1 | 10/2001 | Martin, Jr. et al. | |
| 6,473,500 B1 | 10/2002 | Risafi et al. | |
| 6,757,664 B1 * | 6/2004 | Cardinal et al. ............... 705/38 |
| 6,796,497 B2 | 9/2004 | Benkert et al. | |
| 6,957,770 B1 * | 10/2005 | Robinson ...................... 235/382 |
| 2001/0049672 A1 * | 12/2001 | Moore et al. ...................... 707/1 |
| 2004/0117302 A1 * | 6/2004 | Weichert et al. ............... 705/40 |
| 2005/0027650 A1 * | 2/2005 | Walker et al. .................. 705/38 |
| 2007/0100745 A1 * | 5/2007 | Keiser et al. .................... 705/38 |
| 2007/0198404 A1 * | 8/2007 | Hirka et al. ..................... 705/39 |

OTHER PUBLICATIONS

Federal Reserve Board retrieved Feb. 2008 from the Internet address http://www.federalreserve.gov/pubs/bounce/, This website was archived by web.archive.org on Oct. 19, 2004.*

Richard Craver. (Jun. 16). Consumer groups warn of fees for electronic overdrafts. Knight Ridder Tribune Business News, 1. Retrieved May 11, 2011.*

\* cited by examiner

Primary Examiner — Narayanswamy Subramanian
Assistant Examiner — Kito R Robinson
(74) Attorney, Agent, or Firm — Ungaretti & Harris LLP

(57) ABSTRACT

The invention discloses a reloadable debit card which may be overdrawn by authorized merchants thus allowing future and recurring payments to be made via ACH transactions against this debit card. In addition, the cardholder may repay indebtedness simply by depositing funds onto the reloadable debit card.

11 Claims, 3 Drawing Sheets

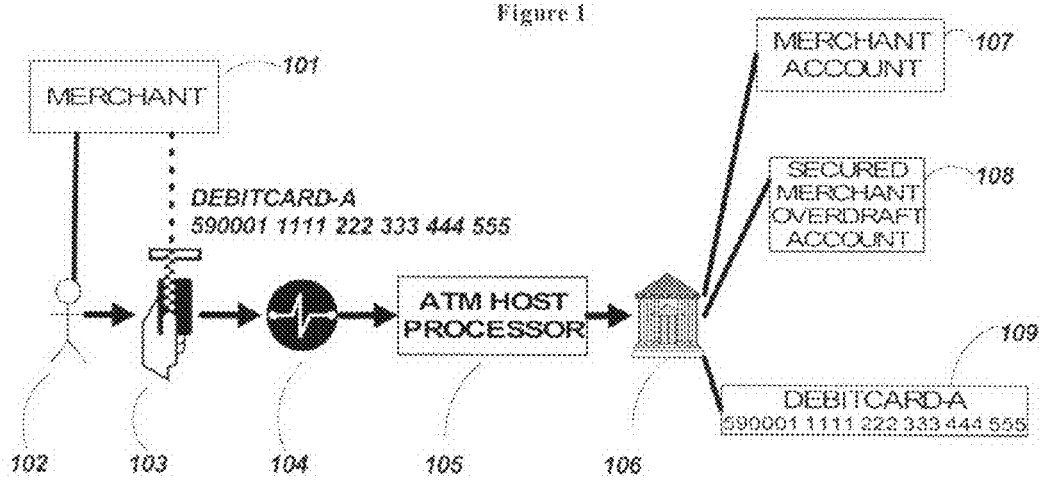

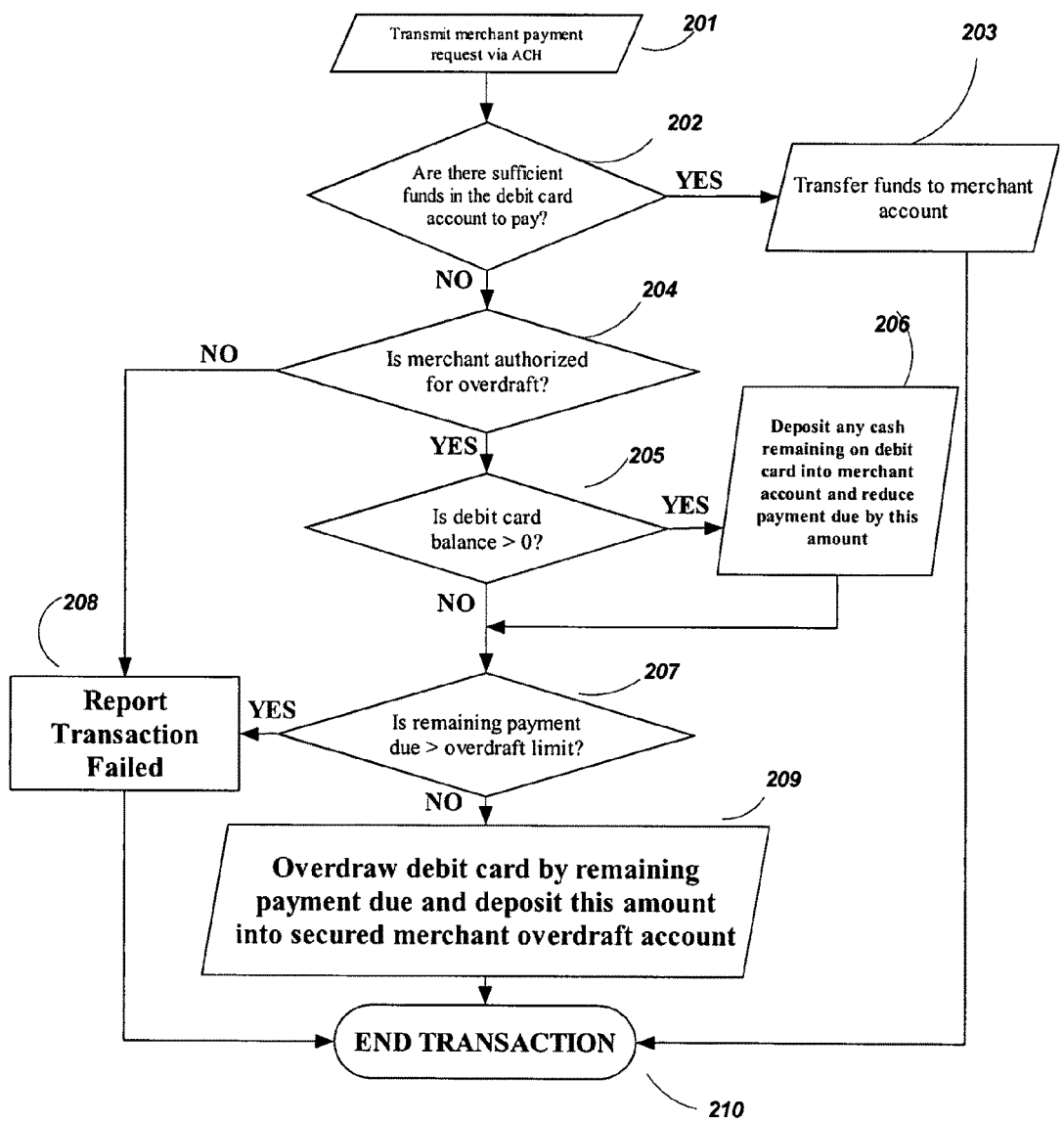

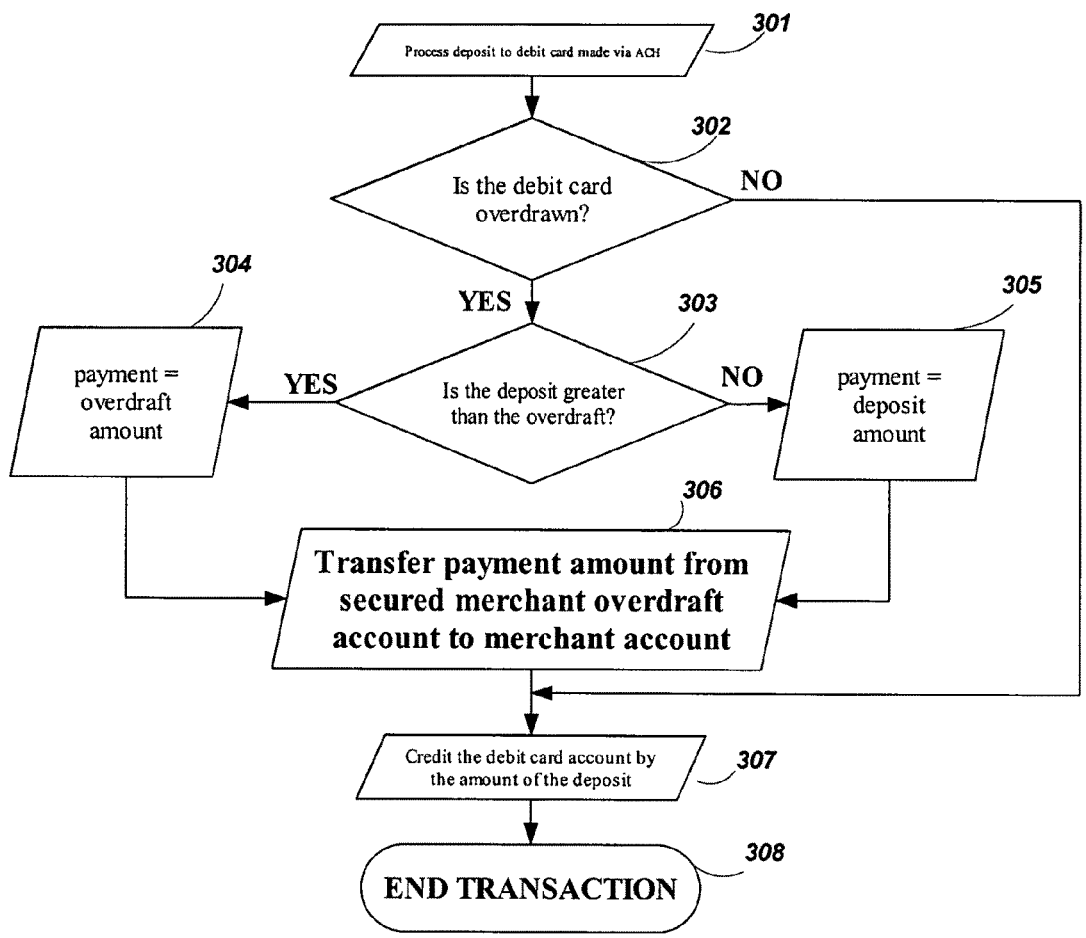

… (1)

METHOD AND APPARATUS FOR ALLOWING SECURED OVERDRAFTS OF RELOADABLE DEBIT CARD ACCOUNTS

CROSS REFERENCE TO RELATED APPLICATIONS

This Application claims priority on U.S. Provisional Application No. 60/763,956 filed on Feb. 1, 2006, which is herein incorporated by reference.

FIELD OF THE INVENTION

The present invention relates generally to the field of banking and more specifically to a system and method for allowing secured overdrafts of certain financial card accounts, namely accounts associated with reloadable debit cards.

BACKGROUND OF THE INVENTION

With the introduction of financial tools like debit cards, smart cards and other "stored value" cards, consumers have more ways to access funds than ever before. Likewise, the number of systems which can use these devices, like ATMs, debit terminals, telephone IVR systems, and internet-based systems have likewise multiplied in number. One of the effects of this increase in electronic access cards and systems is a corresponding increase in electronic funds transactions.

The present invention relates to a certain class of financial cards, i.e. cards which permit the user only to spend the amount of money which has been previously loaded onto the card. Usually these financial cards are attached to an account held at the bank which sponsors the card. "Loading" refers to the process of remotely depositing funds into the account associated with the card, generally via a local merchant.

Institutions holding these accounts have very little risk in handling these transactions since by definition transactions which would result in a negative balance are not permitted.

For instance, Risafi in U.S. Pat. No. 6,473,500 discloses what is now recognized as a reloadable debit card. Benkert in U.S. Pat. No. 6,796,497 discloses cards with attached subsidiary cards which can control how the money on the card is allocated and spent. Martin, Jr. in U.S. Pat. No. 6,304,860 discloses a system to use the ATM network to facilitate automated debt payments.

However, there are situations where permitting such an account to become overdrawn, i.e., carry a negative balance, would be an extremely useful enhancement.

Therefore a need has arisen for a system which permits certain reloadable debit card accounts to become overdrawn. However this must be done in such a way as to eliminate any risk to the institution holding the accounts.

SUMMARY OF THE INVENTION

As indicated above, there are situations where permitting a reloadable account to become overdrawn, i.e., carry a negative balance, would be an extremely useful enhancement. Therefore, it is an aim of the present invention to provide a reloadable debit card account, which can carry a negative balance.

Certain financial cards such as reloadable or prepaid debit cards only allow the user to spend the amount of money they have deposited to the account associated with the card. For the sake of simplicity we will refer to these cards as "reloadable debit cards" although any financial instrument, smart card, RFID or other wireless or electronic system, purse, or wallet could be used provided it meets the conditions of the user being able only to spend or withdraw what has been deposited beforehand, being reloadable, generally remotely, i.e. funds may be loaded onto the card without having to be physically present at the institution issuing the card; and being attached to an account at the issuing institution.

The present invention enhances such cards by allowing them to become overdrawn under certain circumstances, and in doing so permits the use of these cards in a number of situations where this was previously impossible. At the same time, these overdrawn accounts are handled in such a way as to not increase the risk to the institutions holding these accounts.

Companies who have a relationship with the card user and who have made the specific arrangements with the institution sponsoring the card, and using the method disclosed herein would be permitted to cause said accounts to become overdrawn if there are not sufficient funds in the account to cover a requested withdrawal.

Therefore, in accordance with the present invention, there is provided a method for providing overdraft funds to at least one user, the method comprising the steps of:

a) having the user conduct a purchase using a reloadable debit card or the like;

b) wherein when the debit card carries insufficient funds to cover the purchase, overdrawing the debit card by an overdraft amount, that being the difference between the cost of the purchase and the funds available in the debit card; and c) having the user reimburse the overdraft amount.

More particularly, in step c), the user reimburses with additional charges, such as a penalty fee or interest.

For instance, in step a), the purchase is conducted at a merchant, and wherein in step b), it is verified that the merchant is authorized for overdrafts before the debit card is overdrawn.

Also, between steps b) and c), the overdraft amount can be deposited in a secure account.

Furthermore, in step a), the purchase can be conducted at a merchant, and between steps b) and c), the overdraft amount can be deposited in a secure merchant account.

Moreover, in step c), the user can reimburse the overdraft amount with at least one deposit made to the debit card, with at least one amount being taken from the debit card until the overdraft amount has been fully reimbursed, including any additional charges, such as a penalty fee or interest.

BRIEF DESCRIPTION OF THE DRAWINGS

The features of the invention will become more apparent in the following detailed description in which reference is made to the appended drawings wherein:

FIG. 1 is a schematic representation showing the prerequisite elements of a system in accordance with the present invention;

FIG. 2 is a flowchart showing a transaction resulting in an overdrawn balance on the reloadable debit card, in accordance with the present invention; and FIG. 3 is a flowchart shows a payment or deposit being applied on a reloadable debit card, in accordance with the present invention.

DESCRIPTION OF ILLUSTRATIVE EMBODIMENTS OF THE INVENTION

The present invention provides a reloadable debit card account, which can carry a negative balance. It is noted that any such system which proposes to allow these cards to carry a negative balance must mitigate the risk of such an activity with the issuing institution, wherein the institution must be typically protected from any losses stemming from any transaction which results in the account balance associated with the card becoming negative.

Permitting accounts associated with certain reloadable debit cards to become overdrawn allows a class of transactions not currently associated with these card accounts, such as periodic or recurring payments for goods and services, or the ability to make and manage small loans. This assumes an existing relationship between the card user and the company whose payment request causes the account to become overdrawn.

Likewise, consumers could repay indebtedness simply and easily by making deposits, i.e. loading payments, onto the financial card in question. Because this reloading process is becoming widely available at many local merchants, it is in many cases much easier and more convenient for consumers to repay indebtedness in this manner as opposed to the more common method of the company mailing a bill and the user paying with a check or money-order by return mail. This is especially true for those users who may have limited or no access to standard banks or checking accounts.

However it is noted that, since these cards are not designed to allow overdrafts (in fact, they are designed not to allow overdrafts), the only overdrafts that would be permitted require specific prior arrangements between the company whose payment would cause the account to become overdrawn and the institution holding the card account.

Now turning to a more detailed description of the present invention, it is noted that the transactions described herein may be performed via a telephone IVR system, over the Internet or via in any other suitable communication means, but for this illustrative example, we will use Automated Clearinghouse (ACH) transactions.

Referring therefore to FIG. 1, we have a merchant 101, a user 102, a reloadable debit card 103, an ATM network connection 104, an ATM host processor 105, a financial institution 106, and a number of accounts at this institution, e.g. a merchant account 107, a secured merchant overdraft account 108, and a reloadable debit card account 109.

First, the merchant 107 needs an agreement with the institution holding the reloadable debit card accounts 106. In this embodiment, the merchant will have an account 107 with the institution as well as a secured merchant overdraft account 108, although equivalent transactions could be performed even if the merchant kept its accounts at other banks.

The secured merchant overdraft account is the mechanism which protects the institution against any losses. This account is held jointly by the bank and the merchant and its purpose is to typically provide a 100% guarantee for the institution against loss. Any payments withdrawn from a debit card account whose balance is at or below zero are deposited into the secured merchant account. The merchant may not withdraw funds from this account; its only purpose is to act as security against the overdrawn debit card accounts. Of course, there are other alternatives which could provide equivalent securitization such as the freezing of funds in the merchant account 107 equivalent to the total overdraft amounts, or the merchant providing other well-known means of securitization including sufficient collateral to offset any overdrafts.

Next, the user 102 enters into a contractual agreement with the merchant 101. This agreement is usually for the purchase of an item or a small loan. In general, the user 102 receives something of value immediately in return for an agreement to pay for this item with one or more future payments plus fees and interest if applicable.

Then user 102 either already has, or is provided with, possibly by the merchant 101 itself, a reloadable debit card 103. The user 102 agrees to make payments for the item of value via one or more future ACH transactions against this reloadable debit card 103. In the case where the user 102 receives a small loan, the money lent could even be delivered to the user by loading it onto the debit card in question.

Referring now to FIG. 2, we will attempt to process a previously authorized ACH payment transaction 201 against the reloadable debit card account 103. Note that the payment transaction does not necessarily have to be an ACH transaction, but could be any request for payment submitted to the institution holding the debit card account, by any means.

First, at 202, the process verifies if there are sufficient funds on the debit card to process the payment. If so we just pay the merchant 101 by transferring. At 203, funds from the debit account 109 to the merchant account 107.

Now if the funds are insufficient, there is a need to overdraw the account. The next step, at 204, is to determine whether the merchant 101 is authorized to cause the account to become overdrawn. If not, a report is issued at 208 that the transaction has failed, and the transaction ends at 210.

If the merchant 101 is authorized to cause the account to become overdrawn, it is determined at 205 if there is any money in the debit card account that can be used. If there is, the remaining funds are transferred in step 206 from the debit card account 109 to the merchant account 107, and the amount remaining to pay is reduced by this amount.

The amount left to be paid must be handled by causing the account to become overdrawn, whereby the process then verifies at 207 whether this amount is greater than the overdraft limit. If so, a report issued at 208 that the transaction has failed 208, and the transaction ends at 210.

Otherwise, in step 209, the payment amount is transferred out of the debit card account 109 and into the secured merchant overdraft account 108.

Note that it is entirely possible for multiple merchants to cause the debit account to become overdrawn provided they have been previously authorized to do so.

Referring now to FIG. 3, a payment loaded onto the reloadable debit card 109 will now be processed via the ACH system. Note that this deposit does not necessarily have to be an ACH transaction, but could be any deposit submitted to the institution holding the debit card account, by any means.

First, in step 302, the process verifies if the debit card 103 is overdrawn. If it is not, the funds are deposited at 307 to the debit card account 109 and the transaction is complete at 308.

If the debit card 103 is overdrawn, the process then checks at 303 if the deposit amount is greater than the overdraft. If it is, then, at 304, the payment due is equal to the overdraft amount. Otherwise, the payment is equal to the deposit amount, at 305.

Now, the funds (i.e. the "payment" established in the appropriate one of the above steps 304 and 305) can be effectively released in step 306 to the merchant by transferring the "payment" amount from the secured merchant overdraft account 108 to the merchant account 107. Of course, if alternate means were used to secure the overdrafts, then the alternate securitization and or collateral could be reduced by the payment amount, if desired or practicable.

Finally, the funds are deposited at 307 to the debit card account and the transaction is finished at 308.

Note that since multiple merchants might be authorized to overdraw the account, and may have requested payments that have caused the account to become overdrawn (or more overdrawn), applying payments to multiple merchants requires a predetermined method be in place. For instance, a merchant may have priority and be repaid first, or a payment might be allocated proportionally by merchant, or perhaps simply the oldest overdraft would be repaid first. This needs to be determined before allowing multiple merchants to overdraw the account.

Although the invention has been described with reference to certain specific embodiments, various modifications thereof will be apparent to those skilled in the art without departing from the spirit and scope of the invention. The entire disclosures of all references recited above are incorporated herein by reference.

I claim:

1. A method for providing overdraft funds to at least one user, the method comprising the steps of:
   a) pre-authorizing a merchant for overdraft transactions;
   b) having the user conduct a purchase using a reloadable debit card issued by an entity;
   c) wherein when the debit card carries insufficient funds to cover the purchase, electronically overdrawing the debit card by an overdraft amount using a communication means, the overdraft amount being the difference between the cost of the purchase and the funds available in the debit card;
   d) the entity electronically depositing the overdraft amount in a secure account using the communication means; and,
   e) once the user provides to the entity a reimbursement corresponding to the overdraft amount or part thereof the reimbursement is paid to the merchant from the secure account.

2. A method as defined in claim 1, wherein in step d), the user reimburses with additional charges, such as a penalty fee or interest.

3. A method as defined in claim 1, wherein in step b), the purchase is conducted at a merchant, and wherein in step c), it is verified that the merchant is authorized for overdrafts before the debit card is overdrawn.

4. A method as defined in claim 1, wherein in step e), the user reimburses the overdraft amount with at least one deposit made to the debit card, with at least one amount being taken from the debit card until the overdraft amount has been fully reimbursed, including any additional charges, such as a penalty fee or interest.

5. A method as defined in claim 1, wherein the step of authorizing a merchant for overdraft transactions comprises authorizing a plurality of merchants, each merchant from the plurality of merchants having a priority rank, the payment of any reimbursement being made in step e) in accordance with the priority rank of the merchants.

6. A method as defined in claim 1, wherein overdrawing the debit card is a plurality of overdrawings defining an overdrawing sequence, the reimbursement in step e) each overdrawing from the plurality of overdrawings being made in accordance with the overdrawing sequence.

7. A method as defined in claim 6, wherein the oldest overdrawing is first reimbursed.

8. The method of claim 1 wherein the step of electronically depositing the overdraft amount in a secure account using a communication network comprises utilizing the Internet.

9. The method of claim 1, wherein the secure account is jointly held by the merchant and the entity.

10. The method of claim 1, wherein the entity is a financial institution.

11. A method for providing overdraft funds to at least one user, the method comprising the steps of:
   a) pre-authorizing a merchant for overdraft transactions;
   b) having the user conduct a purchase using a reloadable debit card;
   c) wherein when the debit card carries insufficient funds to cover the purchase, electronically overdrawing the debit card by an overdraft amount over a communication means, the overdraft amount being the difference between the cost of the purchase and the funds available in the debit card;
   d) securingly setting aside the overdraft amount; and
   e) once the user provides a reimbursement corresponding to the overdraft amount or part thereof, paying the reimbursement to the merchant.

* * * * *